United States Patent

Markwick

[15] 3,706,378
[45] Dec. 19, 1972

[54] AUTOMATIC ENDLESS BELT TYPE FILTER

[72] Inventor: John P. Markwick, Clawson, Mich.

[73] Assignee: H. R. Black Company, Detroit, Mich.

[22] Filed: Feb. 24, 1971

[21] Appl. No.: 117,932

[52] U.S. Cl. ..................210/107, 210/108, 210/400
[51] Int. Cl. ..............................................B01d 33/32
[58] Field of Search......210/108, 122, 391, 400, 401, 210/107

[56] References Cited

UNITED STATES PATENTS

| | | | |
|---|---|---|---|
| 3,197,030 | 7/1965 | Black | 210/400 |
| 3,219,188 | 11/1965 | Hirs | 210/400 X |
| 3,464,563 | 9/1969 | Dahlem et al. | 210/400 |
| 3,459,309 | 8/1969 | Eckstein | 210/400 X |
| 3,513,974 | 5/1970 | Markwick | 210/122 X |

Primary Examiner—Samih N. Zaharna
Attorney—Cullen, Settle, Sloman & Cantor

[57] ABSTRACT

The filter of the present invention is of the automatic endless belt type and is contained in a housing; the filter housing is disposed in a tank filled with clean fluid and the filter housing has an inlet for dirty fluid and an outlet for clean fluid communicating with the fluid in the tank; an electromechanical automatic control system is provided to rotate the filter assemblies in predetermined increments in response to the degree of contamination along certain areas of the filter media. The filter media is supported on a screen adapted for travel in the fashion of an endless belt and improved sealing means are provided which cooperate with means along the guide supports of the endless filter belt along both outer margins thereof.

4 Claims, 9 Drawing Figures

INVENTOR
JOHN P. MARKWICK
ATTORNEYS

FIG. 9

AUTOMATIC ENDLESS BELT TYPE FILTER

REFERENCE TO RELATED APPLICATIONS

The present application is related in substance to U.S. Pat. No. 3,197,030, and represents certain important improvements thereover.

BACKGROUND AND SUMMARY OF THE INVENTION

The present invention relates to automatic filters of the endless belt rotating type, and more in particular to an apparatus incorporating means to automatically clean the filter media in response to the degree of contamination of the filter media. In addition, improved sealing means are provided between the endless belt which carries the filter media and the belt supporting members of the endless band. Additionally, a bottom seal plate is provided which is adapted to seal the bottom half of the filter assembly to cause dirty fluid to enter only at the top of the filter assembly.

In known automatic filter arrangements of the endless belt type, the rotating filter assembly has to be stopped at certain intervals in order to clean the filter media of the sludge and other contaminants collected thereon. This causes delay and shut-down of the operation with which the filter assembly is associated, such as a parts cleaning line or the like. In other instances, separate filter assemblies have to be incorporated for alternate operation, so that, while one filter assembly is cleaned, the other filter assembly takes over. This conventional arrangement, of course, requires additional installation space at higher initial cost of installation.

Accordingly, the primary object of the present invention is to provide an automatic rotatable filter assembly of the endless belt type incorporating an automatic self cleaning feature to continuously clean the filter media in response to the degree of contamination of the fiber media.

The present improved filter apparatus is constructed in the form of an endless belt of wire mesh or the like, which is rotatable by means of sprocket wheels and a pair of endless chains supporting opposite sides of the belt. The wire mesh or screen belt carries a plurality of individual, replacable filter medias and is contained in a closed housing having a dirty fluid inlet and a clean fluid outlet. The filter housing is submerged in a cleaning fluid tank and automatic control means are provided which at timed intervals cause automatic movement of the endless belt to move the contaminated filter medias from the dirty fluid receiving position into a washing station disposed along the endless belt. Filter movement can also be initiated by means of a pressure differential within the filter housing and the fluid pressure in the cleaning fluid tank, in which the filter housing is submerged.

Automatic cleaning of the contaminated filter media is accomplished by directing blasts of fluid against the contaminated filter media, which have been moved into the washing or the cleaning area, to remove the contaminants from the filter media for disposal into a sludge receptacle communicating with the filter housing at the cleaning area of the filter.

The lower portion of the filter housing along which the cleaned filter media moves, is provided with sealing means to prevent entrance of dirty fluid from the bottom of the filter assembly. Thus, the dirty fluid can enter only at the top of the filter assembly. Intermittent rotation of the filter assembly is initiated by means of a slip clutch or one-way clutch which permits rotation in only one directions.

The primary features and objects of the present invention will become more fully apparent by reference to the following detailed specification in connection with the appended drawings.

BRIEF DESCRIPTION OF THE DRAWINGS

The accompanying drawings illustrate a preferred embodiment of the present improved filter apparatus in which.

DETAILED DESCRIPTION OF THE INVENTION

It will be understood that the above drawings merely illustrate a preferred embodiment of the invention, and that other embodiments are contemplated within the scope of the claims hereafter set forth.

Figure 1:
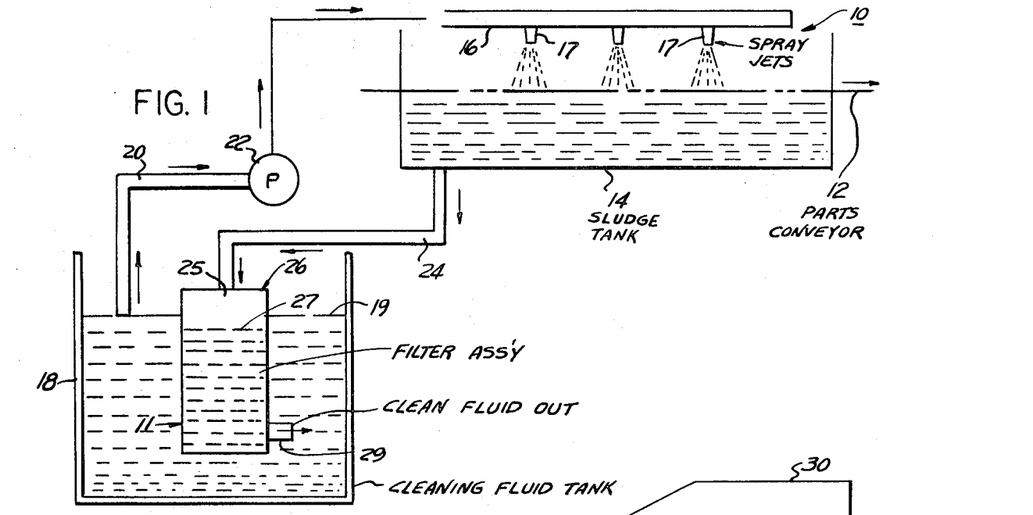
FIG. 1 is a schematic diagram of the present improved filter apparatus and parts processing line with which the present improved filter apparatus may be associated.

With reference to FIG. 1, reference numeral 10 generally indicates a production line including conveyor means 12 which is adapted to transport articles or parts (not shown), which have been fabricated, machined or otherwise processed, through a sludge cleaning tank 14. Above the sludge cleaning tank 14 and aligned with the conveyor means 12 is a pipe 16, which is provided with a plurality of spray heads 17 which are adapted to rinse a part moved along the conveyor means 12 by means of a cleaning fluid from a source 18 to remove sludge or other loose particles and contaminations from the parts or articles disposed on the conveyor means 12, as is known in practice.

The source 18 represents a cleaning fluid supply tank which has an outlet conduit 20 connected to a pump 22. The outlet of the pump 22 is connected to the pipe 16, so as to continuously supply cleaning fluid to the spray heads 17. The cleaning tank 14, through which the conveyor means 12 moves, has an outlet conduit 24 which leads into the upper end of a filter apparatus 26, defined by the improved filter structure of the present invention and which is submerged within the cleaning fluid of the supply tank 18.

With continuing reference to FIG. 1, the present improved filter apparatus 26 is therein exemplarily shown to be incorporated in a fluid cleaning installation for parts, articles, or the like, which previously had undergone machining, forging or other such manufacturing operations, and which need to be conditioned for further manufacturing operations.

Machined parts, immediately after the machining operation, usually are covered with sludge, loose particles and other contaminants, when they leave the machining station and they need to be thoroughly rinsed by fluid spray means to be clean for the next machining operation. Thus, the parts (not shown) are placed on a conveyor means 12 which slowly moves through a cleaning tank 14, to be thoroughly spray rinsed by means of multiple spray heads 17 disposed above and along the conveyor means 12 within the cleaning tank 14. As is known, the cleaning fluid being used to thoroughly rinse and spray-clean the parts, is not merely pure water but usually a fluid of certain combination. For economical reasons, it is obviously desired to recapture as much of the cleaning fluid as possible for reuse. This, of course, necessitates thorough filtering of the cleaning fluid collected in the bottom of the cleaning tank 14.

In this instance of the exemplarily installation schematically illustrated in FIG. 1, the present improved filter apparatus 26 is designated for this purpose. Thus, the filter apparatus 26 receives the dirty or contaminated fluid and subsequent return through outlet 29 into the cleaning fluid supply tank 18 which supplies spray heads 17 with cleaning fluid by means of a pump 22. The inlet of the pump 22 is fluidly connected by conduct 20 to the cleaning fluid supply tank 18 and the outlet of pump 22 is connected by pipe 16 to the spray heads 17, as schematically indicated in FIG. 1.

In order to facilitate installation and for certain other reasons hereafter to be described, the present improved filter apparatus 26 is preferably immersed within the cleaning fluid supply tank 18. In normal operation the cleaning fluid supply tank 18 has a fluid level 19 defining a certain pressure head and filter apparatus 26 having a fluid level 27 which may be at a different height than the fluid level 19. Normally, that is under clean filter medium conditions, the fluid pressure between the dirty fluid inlet 25 of the filter apparatus 26 and clean fluid outlet 29 leading into the cleaning fluid supply tank 18, is equalized. However, as will be understood by those skilled in the art, as the filter medium becomes contaminated with the sludge and dirt extracted from the dirty fluid, fluid flow through outlet 29 will be reduced in accordance with the rate of contamination of the filter medium, thus creating a pressure differential between the fluid inlet 25 and clean fluid outlet 29 which, as will be fully described in detail hereafter, is utilized herein to initiate the automatic self-cleaning action of the improved filter apparatus 26.

Figure 2:
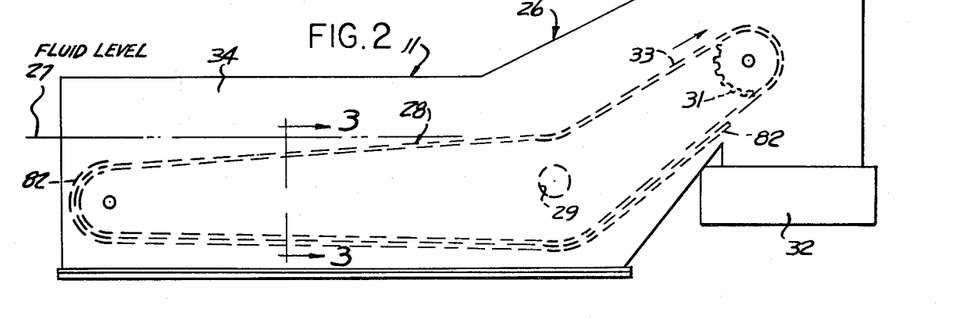
FIG. 2 is a fragmentary enlarged side view of the present improved filter apparatus in which the endless filter band assembly is shown in dotted lines.
Figure 3:
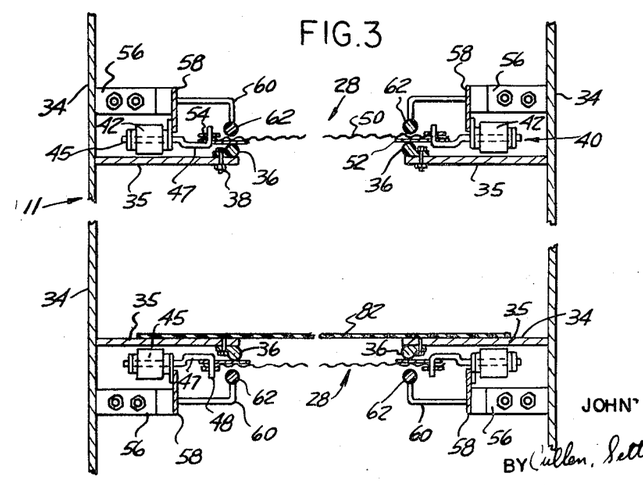
FIG. 3 is a transverse cross-section through the apparatus shown in FIG. 2 on an enlarged scale taken along line 3—3 in FIG. 2.
Figure 4:
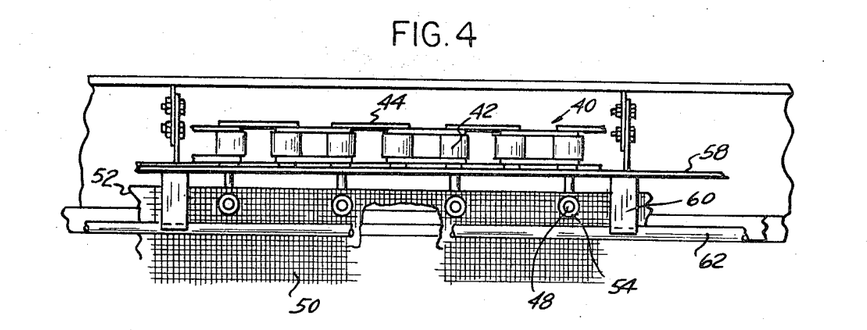
FIG. 4 is a fragmentary enlarged plan view particularly illustrating the chain drive and marginal filter belt attachment.

With reference now to FIGS. 2 to 4, the present improved automatic filter apparatus 26 includes a housing, generally indicated at 11, which is adapted to be immersed within the cleaning fluid supply tank 18, as explained herebefore, and which itself contains a supply of dirty fluid to be filtered. As indicated in dotted lines in FIG. 2, the filter housing 11 contains a continuous filter belt assembly 28 adapted to be intermittently driven by conventional sprocket and chain drive arrangement, such as for instance disclosed in applicant's prior U.S. Pat. No. 3,197,030.

the filter housing 11 at one end is inclined upwardly to define a head portion 30 enclosing the upper return end of the continuous filter belt assembly 28. The head portion 30 of the filter housing 11 also contains the present improved automatic self-cleaning mechanism to be described hereafter. At its bottom the head portion is provided with an extension or receptacle 32 which is adapted to receive the sludge contaminants and other foreign particles removed from the cleaning fluid by means of the filter belt assembly 28 for subsequent disposal. As indicated in FIG. 2, the fluid level 27 within the filter apparatus 26 is normally below the upwardly inclined head portion 30, that is, below the cleaning station of the filter media which is contained within the head portion 30. Means to be described are provided in the lower portion of the filter housing 11 to prevent entrance of dirty cleaning fluid into the continuous filter belt assembly 28 from below.

With particular reference now to FIGS. 3 and 4, in the known filter apparatus of applicant's earlier U.S. Pat. No. 3,197,030 of which the present application is an improvement, the filter housing 11 includes a pair of upright side walls 34 and upon the interior thereof they are provided with continuous guide flanges 35 which have a shape generally conforming to the shape of the continuous filter belt assembly 28 as shown in FIG. 2. These flanges are mounted on and project inwardly from the respective side walls 34 and are suitably secured thereto as by welding or the like to thus define upon the walls 34 of the filter housing a pair of opposed guides of closed loop form.

As shown in FIG. 3, substantially continuous sealing bars 36 of plastic or other similar material and generally circular in cross-section are mounted along each of the inner marginal edges of both opposed guide flanges 35 by means of fastener assemblies 38. In assembly, the inwardly directed marginal edges of the continuous filter belt assembly 28 are adapted to sealingly contact upon sealing bars 36 continuously along their entire lengths.

The continuous filter belt assembly 28 is adapted to be intermittently driven along its endless path by means of a drive sprocket 31 (FIGS. 7 and 8) disposed at the upper inclined end of the filter belt assembly 28 in the head portion 30 of the filter housing 11. The drive sprocket 31 has a pair of opposite spaced toothed wheels which are adapted to drivingly engage a pair of endless drive chains 40. The pair of drive chains 40 are guidably and movably mounted over and around looped flanges 35 as shown in FIG. 3, and each includes a plurality of rollers 42 and interconnecting chain links 44 mounted on the ends of the roller shafts 45.

As shown in FIGS. 3 and 4, every other one or selected ones of the roller shafts 45 are extended inwardly beyond the chain links 44 a substantial distance towards the edges of the guide flanges 35.

As more particularly shown in FIG. 3, the selected ones of the roller shafts 45 extend transversely inwardly and have a horizontally displaced portion 47 which is parallel with the roller shaft 45. The displaced portion 47 terminates into hook portion 48.

Preferably, the continuous filter belt assembly 28 is composed of an inner screen 50 of wire mesh or plastic material and is preferably provided along its marginal edges with spaced and slightly enlarged and reinforced apertures by which the marginal edges of the endless filter screen band 50 can be hooked over the opposed hook portions 48 of the extended roller shafts of the drive chains 40 to secure the endless filter screen 50 to the opposed drive chains across the gap between the opposed guide flanges 35. Thus, when the roller drive chains 40 are driven by means of rotation of the drive sprockets 31, the chain rollers 42 roll along the surfaces of the guide flanges 35 for movement of the filter screen 50 in a selected direction.

As shown, in FIGS. 3 and 4 of the drawings, in order to minimize wear of the preferably metallic or plastic filter screen band 50 there are provided adjacent opposite longitudinal edges of the screen protective plastic strips or plastic coating 52 nylon or other suitable wear resistant plastic material which are secured to the under or inner side of the marginal edges of the endless filter screen 50. As further illustrated in FIGS. 3 and 4, a plurality of grommets 54 are provided along the marginal edges of the endless filter screen band 50 and fastened thereto at selected spaced intervals corresponding to the spacing between adjoining hook portions 48 of the roller chains 40. The grommets 54 cooperatively fit over the hook portions 48 of the extended roller shafts 45 of the drive chains 40 on which the endless filter screen band 50 is supported and stretched between the opposed roller drive chains 40 for movement along the guide flanges 35.

Additionally, a series of longitudinally spaced support plates 56 project radially inwardly from the interior of the side walls 34 of the housing 11 and are fixedly secured thereto as by welding or the like. Attached to the support plates 56 are adjustable guard rails 58 which are of continuous configuration corresponding to the loop form of the guide flanges 35 and endless filter belt assembly 28. Guard rails 58 are adapted to loosely abut against the inside of the rollers 42 of the drive chains 40 to further maintain the opposed drive chains 40 in correct spaced relationship on the guide flanges 35. A plurality of brackets 60 are mounted on the guard rails 58 on which are mounted continuous bars 62 in juxtaposed aligned position to the lower sealing bars 36 for retainment of the marginal edges of the endless filter screen 50 in between them. The upper continuous bars 62 serve as pull down bars to maintain the filter screen 50 in driving engagement with the hook portions 48 of the roller drive chains 40 as the filter screen moves along its looped path. For convenience, the hold-down bars 62 could be made of the same plastic material as the lower sealing bars 36 to thus provide additional sealing engagement along the marginal edges of the filter screen 50.

Thus far, the foregoing description, particularly in reference to FIGS. 3 and 4, is in conformity with the construction disclosed in applicant's earlier U.S. Pat. No. 3,197,030. In accordance with the present invention, the structure of the endless filter band assembly 28 has been improved by provision of the following modifications.

Figure 5:
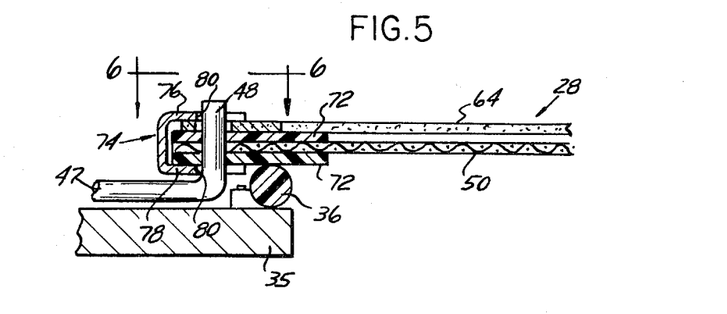
FIG. 5 is an enlarged fragmentary section of the present improved marginal filter belt attachment to the chain drive and improved sealing arrangement.
Figure 6:
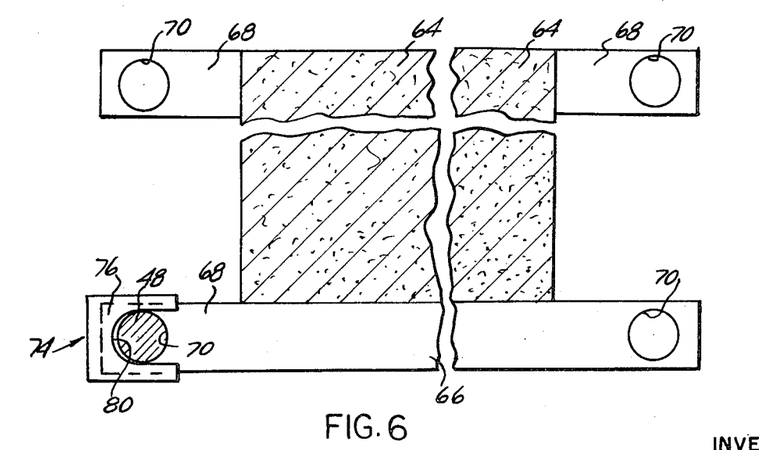
FIG. 6 is a fragmentary top plan view of the arrangement shown in FIG. 5.

With reference to FIGS. 5 and 6, the endless filter screen 50, which, as mentioned, may be a metal wire mesh or plastic mesh, such that in the improved construction and in accordance with the present invention is adapted to carry a plurality of individual flat sheet like filter medium 64. The individual filter mediums 64 are identical in size and substantially extend across the entire width of the endless screen 50 and are disposed one adjacent each other in longitudinal direction to thus form a conjoined endless belt structure overlying the endless belt 50. The individual filter mediums 64 are preferably made of a fibrous filter material of any known combination and are attached along both transverse edges to reinforcing bars 66 which may be frame or channel members of sheet metal or plastic to retain the filter medium 64 inbetween them. The outer ends of each of the pair of transverse frame members 66 extend outwardly to form ears 68 each of which is apertured as at 70. The ears 68 of the individual filter mediums 64 form opposite attaching means to the hooks 48 of the roller chains 40 by means of the apertures 70 in the ear portions 68. By the provision of the individual fibrous filter mediums 64 as an overlay over the relatively coarse endless screen 50 an improved filter action is provided to effectively extract micro-fine particles from the dirty fluid passed into the filter housing 11 through the inlet 25.

As particularly seen in FIG. 5, the endless filter screen band 50 has been modified by the provision of a nylon or a plastic coating 72 to both the upper and the lower surfaces along the marginal edges on both sides of the filter screen 50. The marginal edge coating 72, as shown in FIG. 5, is shown in slightly exaggerated proportion for clarity. These marginal edge coatings of nylon or other plastic material provide an effective permanently bonded seal along the marginal edges of filter screen 50. The inner marginal edge coating of the filter screen is retained in continuous sealing engagement on the continuous longitudinal sealing bars 36 provided along the edges of the opposite guide flanges 35.

As further shown in FIGS. 5 and 6, the endless filter screen band 50 together with ear portions 68 of the individual overlying filter mediums 64 are securely retained on the hook portions 48 of the roller chains 40 by means of spring clips 74. The spring clips 74 are of generally U-shaped having an upper leg portion 76 and lower leg portion 78. Leg portions 76 and 78 of the spring clip 74 are adapted to clamp over the top portion of the respective ear 68 of the filter medium 64 and against the underside of the nylon coated marginal edge 72 of the endless filter screen 50 to clampingly retain these members in abutting relationship. Both leg portions 76 and 78 are provided with aligned recesses 80 by which the spring clip 74 is adapted to be snapped over and around the hook portion 48 as shown to thereby securely retain the filter screen and filter mediums attached to the opposite roller chains 40 as the filter assembly moves around its endless path, the ends of mediums 64 being overlapped.

With reference again to FIG. 2, a further improvement of the present application over the earlier disclosure U.S. Pat. No. 3,197,030, indicated in FIG. 2, is that the upper inclined end of the filter assembly 28 has been modified by providing a straight filter return section 33 disposed at an upwardly inclined angle relative to the substantially horizontal portion of the endless filter assembly 28. The normal dirty fluid level within the filter housing 11 is indicated by the line 27 and, since the marginal edges of the endless filter assembly 28 are sealed against the guide flanges 35 around which the filter travels, dirty fluid is not permitted to enter the interior of the endless filter assembly formed by the opposite guide flanges 35, housing walls 34 and the filter band as shown in FIG. 3. Thus, fluid has to pass through the top of the filter in order to exit through the outlet 29 back into the cleaning fluid supply tank 18.

In accordance with the present invention, a further improvement is provided by the provision of a longitudinally continuous bottom sealing plate 82 which may be made of a plastic material. Sealing plate 82 is bonded to the upper surfaces of the opposed lower guide flanges 35, as shown in FIG. 3, for continuous extension along the entire bottom portion of the endless filter assembly 28 and extending partially up along the inclined filter portion 33 above the liquid level 27 and partially around the lower return end of the filter assembly. By provision of the continuous sealing plate the dirty fluid within the filter apparatus 26 is permitted to enter the endless filter assembly 28 only from the top surface thereof so that at any one time during filter operation only about one half of the filter mediums 64 of the endless filter assembly 28, disposed along the top portion of the filter assembly are effective in the filtering operation, whereas the filter mediums traveling along the bottom portion of the filter assembly are effectively protected against passing any fluid therethrough by means of the continuous sealing plate 82 which prevents entrance of the dirty fluid into the interior of the filter assembly from the bottom thereof. In addition, the continuous bottom sealing plate 82 prevents back wash of clean filtered fluid from the interior of the filter assembly through the bottom portion of the filter assembly so that the cleaned fluid can only exit through the outlet 29.

Figure 7:
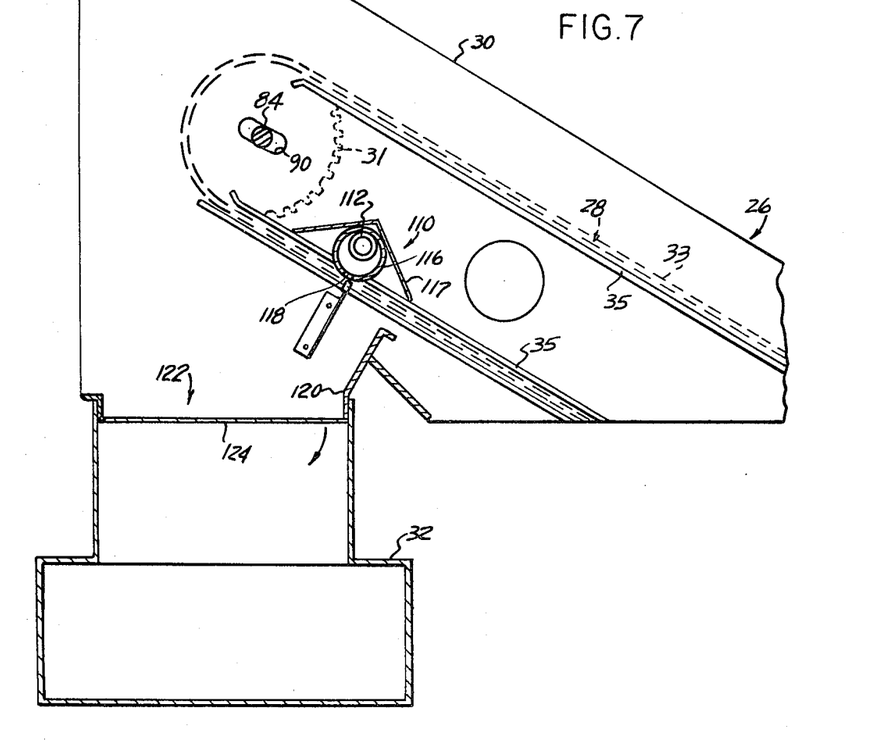
FIG. 7 is an enlarged fragmentary illustration of the improved cleaning arrangement of the filter apparatus disposed in the upper top section of the filter apparatus.
Figure 8:
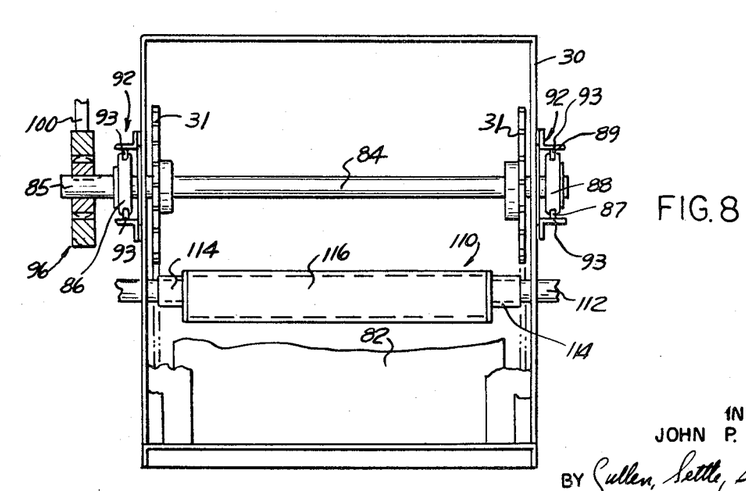
FIG. 8 is a left hand front view of the upper part of the filter apparatus of FIG. 7.

With reference now to FIG. 7 and 8, which are enlarged, cross-sectional, fragmentary illustrations of the inclined upper section 30 of the filter housing 11, the drive sprocket 31 is supported for rotation on a drive shaft 84. The drive shaft 84 extends at both ends through the housing side walls for rotatable support within a pair of opposite bearing assemblies 86 and 88 respectively.

The sprocket drive shaft 84, at both sides of the housing portion 30, extends through aligned slots 90 in the opposed side walls 34 which are disposed along the centerline of the inclined filter section 33 for relative longitudinal adjustment of the sprocket wheel to maintain tightness in the filter drive chain assembly.

Adjustment of the sprocket wheel 31 is preferably accomplished by means of conventional take-up assemblies 92 which slidingly support the opposite drive shaft bearing assemblies 86 and 88. The external surfaces of the bearing assemblies 86 and 88 are provided with opposite longitudinal slots 87–89 respectively, adapted to extend into guide flanges 93 of the take-up assemblies 92. Thus, the opposite bearing assemblies 86 and 88 are longitudinally movable in the direction of the slots 90 by means of any known screw type adjusting mechanism or the like (not shown).

One end of the sprocket drive shaft 84 is extended as is 85 and is attached to the inner member 94 (FIG. 9) of a slip clutch or one-way clutch assembly 96. The slip clutch assembly 96 commonly may be a sprag type one-way clutch, ratchet clutch or other known one-way drive mechanism.

Figure 9:
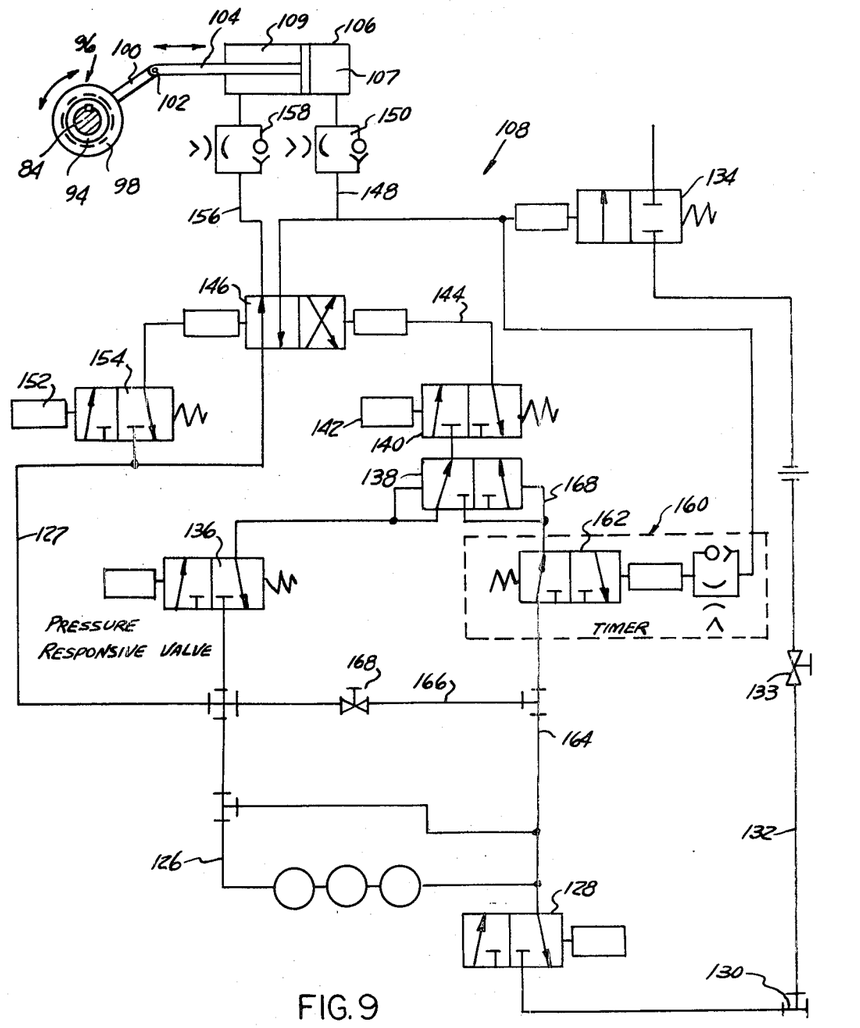
FIG. 9 illustrates a representative schematic drive control system for the present improved filter apparatus.

With additional reference to FIG. 9, the outer member 98 of the slip clutch assembly 96 is provided with a lever or arm 100 which other end is pivotally attached as at 102 to the end of a piston rod 104. The piston rod 104 is part of a fluid cylinder assembly 106 adapted for selective reciprocable actuation by means of a fluid control mechanism schematically indicated at 108, which operation will be described further on in the specification. Thus, upon fluid actuation of the cylinder 106, the piston rod 104 is advanced outwardly a predetermined distance to exert a force on the lever 100 to thereby rotate the slip clutch assembly 96 together with the sprocket drive shaft 84 an angular distance corresponding to the distance of movement of the piston rod 104. Upon return movement of the piston rod 104 in response to actuation by the control mechanism 108, the outer member 98 of the slip clutch assembly 96 merely slips or ratchets over the inner member 94 so as not to rotate the sprocket drive shaft 84 in the opposite direction.

Thus, an operating mechanism is provided which is adapted to intermittently rotate the sprocket drive shaft 84 at predetermined increments as determined by the degree of contamination of the filter mediums 64 and always in one direction, preventing rotation of the endless belt filter assembly 28 in the other direction.

A primary feature of the present invention and further improvement over earlier U.S. Pat. No. 3,197,030, includes an automatic filter washing means indicated generally at 110 which is co-actingly actuated in conjunction with the automatic rotation of the endless filter assembly 28.

The automatic filter washing means 110 includes a pipe 112 which is fluidly connected to a dispenser pipe 116 be means of fitting 114 disposed within the filter housing portion 30. The pipe 112 is suitably connected to a source of fluid pressure (not shown) which may be air or hydraulic, depending on any particular installation requirement.

The intermediate dispenser pipe section 116, which is of substantially larger diameter than the supply pipe 112, extends transversely across the filter housing and thus across the endless filter assembly 28 and is suitably attached as by welding or by other means to brackets 117 to retain the dispenser pipe 116 in position. The bracket or brackets 117 are in turn suitably secured to the guide flanges 35 within the filter housing or to other stationary members of the filter housing to retain the dispenser pipe 116 slightly suspended above the surface of the endless belt filter assembly 28.

The intermediate dispenser pipe 116 is longitudinally slotted as at 118 along a direction normal to the direction of movement of the endless belt filter assembly 28. Conversely, the fluid dispenser pipe 116 can be provided with a plurality of jet openings or continuous slot along its bottom surface directed against the endless filter belt assembly 28 for delivery of fluid under pressure therethrough. The bottom of the housing section 30 is provided with an angular disposed baffle member or deflector 120 immediately adjacent the lower end of the filter washing means 110. The baffle member or deflector 120 is disposed adjacent one end of an opening 122 normally closed by a flexible flap member 124 which provides communication with the sludge collecting receptacle 32 disposed below the bottom of the filter housing section 30.

Thus, in the embodiment herein illustrated, upon application of fluid under pressure through the dispenser pipe 116, the fluid will exit through the relatively narrow slot 118, causing a jet stream of fluid pressure to be directed against the endless filter assembly 28 as it slowly moves underneath and past the washing means 110. Timed or automatic actuation of the cylinder 106 causes rotation of the sprocket wheels 31 in a selected one-way direction to move the contaminated filter mediums past the washing means 110. The blast of fluid under pressure through the elongated slot 118 in the dispenser pipe 116 (or respectively individual streams of fluid pressure dispensed from a plurality of jet openings along the dispenser pipe 116 instead of the longitudinal slot 118) removes the sludge and other contaminants collected by the filter assembly. The sludge is deposited in the bottom of the upper section 30 of the filter housing onto the flexible flap 124 which is open to permit exit of the sludge and contaminants into the sludge receptacle 32.

The incremental intermittent feed of the filter assembly 28 in order to clean the contaminated filter mediums 64, can be based upon a preset timer mechanism which is actuated at predetermined intervals to cause fluid actuation of cylinder 106 to rotate the sprocket drive shaft 84 a predetermined increment or, conversely, the actuation may be automatic in response to a pressure differential of certain magnitude between the fluid level 19 in the cleaning fluid supply tank 18 and the fluid level 27 in the filter assembly 26.

In reference to automatic actuation of incremental filter feed past the washing means 110, it will be understood that as the filter mediums 64 and endless filter screen 50 become more and more contaminated to a certain extent, dirty fluid will be caused to pass more slowly through the filter assembly with the result that the level of dirty fluid within the filter assembly will rise to thereby establish a pressure differential between the levels of fluid within the clean fluid supply tank 18 and the filter assembly 26, which by means of suitable pressure responsive devices may be utilized to cause fluid actuation of the cylinder 106.

It shall be mentioned herein that in certain installations the washing means 110 may be installed outwardly of the endless filter belt assembly 28, instead of inwardly thereof as shown in FIGS. 7 and 8. In that case, the washing means would be arranged such as to blow fluid under pressure at a somewhat angular position against the slowly moving endless filter belt assembly 28 to remove sludges and contaminants from the surfaces of the filter mediums 64 to be dropped onto the flexible flap 124 of the sludge receptacle opening 122.

In FIG. 9, there is schematically shown, for example, a combined predetermined timer or automatic pressure responsive control system for rotation of the sprocket drive shaft by cylinder 106.

This system, as generally indicated at 108, has a fluid pressure line 126 connected by means of a manual valve 128 to a source of fluid under pressure at 130 (not shown). The source of fluid under pressure (not shown) is similarly connected at 130 by a line 132 to a pressure relief valve 134. Pressure bleed-off line 132 is manually controllable by means of a manual valve 133.

Fluid pressure from the source of fluid under pressure (not shown) through line 126 is directed into a pressure responsive valve 136 which may be mechanically actuatable by means of a diaphragm mechanism or by a float mechanism which ever is more applicable. Thus, upon detection of a pressure differential between the fluid levels 19 in the cleaning fluid supply tank 18 and level 27 in filter assembly 26, valve 136 will be actuated to permit flow of pressurized fluid from line 126 into the left hand of a shuttle valve 138 and from there into a control valve 140. The control valve 140 is actuatable by a cam mechanism 142 which is mechanically connected to the slip clutch mechanism 96. Thus, in released position of the slip clutch assembly 96, pressurized fluid will be caused to flow through control valve 140 and conduit 144 into a main control valve 146 to position the valve element therein in order to deliver fluid through conduit 148 and pilot operated check valve 150 into the rear end 107 of the fluid cylinder 106. Increased fluid pressure in the rear end 107 of the fluid cylinder 106 causes the piston rod 104 to be moved outwardly of the fluid cylinder 106, that is towards the left in FIG. 9, to thereby rotate the sprocket drive shaft 84 an incremental distance through positive drive connection with the slip clutch assembly 96. At the end of the piston rod movement 104, as determined by existing fluid pressure in the rear 107 of the fluid cylinder 106, the cam 142 of the control valve 140 which, as mentioned before, is mechanically connected to the slip clutch assembly 96, causes repositioning of the control valve 140 to interupt further fluid flow therethrough. At the same time, a further cam means said which is similarly co-actingly associated with the slip clutch assembly 96, is caused to actuate the repositioning of a return fluid control valve 154, which is similar to control valve 140. This causes opposite flow of fluid through fluid pressure supply line 126, line 127 and through main control valve 146, conduit 156 and pilot pressure operated check 158 into the front end 109 of the fluid cylinder 106 to thereby reverse movement of the piston rod 104 to return the slip clutch assembly 96 to its initial position without rotating the sprocket drive shaft 84. During return movement of the piston rod 104 within cylinder 106, fluid pressure from the rear end 107 of the cylinder will be bled off through the one-way check valve 150 to the atmosphere.

For alternate timed operation not depending on the fluid pressure differential between the dirty fluid in the filter assembly 26 and the fluid pressure within the cleaning fluid supply tank 18, a timing mechanism, generally indicated at 160, is provided which includes a control valve 162 suitably connected by conduit 164 to manual valve 128 and to the source of fluid under pressure (not shown). The timer control valve 162 is further connected by means of conduit 166 directly to the fluid pressure line 126, conduit 127 and fluid pressure responsive valve 136. As shown, the timer control valve 162 is further fluidly connected by means of conduit 168 to the right side of the shuttle valve 138 for selective fluid connection to the cam operated control valve 142 and main control valve 146. A manual shut-off valve 168 is provided in line 166 to permit either fluid pressure differential operation through pressure differential responsive valve 136 or timed operation of the control mechanism through the timer arrangement 160.

Either fluid pressure control system embodies conventional components which do not form a part of the present invention other than in combination.

In operation, dirty fluid is introduced through conduit 24 from the sludge collecting tank of the parts cleaning device 10 into the filter apparatus 26 through inlet 25. The filter apparatus 26, as mentioned before, is immersed into the fluid of the cleaning fluid supply tank 18 and has a clean fluid outlet 29 to convey the fluid after cleaning in the filter apparatus 26 back into the cleaning fluid supply tank 18. As described herebefore, the dirty fluid entering through inlet 25 of the filter apparatus 26 can enter the continuous filter assembly 28 only along the top section, entrance through the bottom being prevented by the continuous sealing plate 82, as shown in FIG. 3 and FIG. 2.

The dirty fluid indicated by fluid level 27, enters the endless belt filter assembly 28 along the top portion of the filter covered by the fluid. The filter assembly 28 is intermittently moved in clockwise direction as indicated in FIG. 2. Thus, as the separate filter mediums 64 carried on the endless screen 50 approach the upper inclined portion 33 of the filter assembly 28, they are more or less thoroughly contaminated with sludge and other loose particles sprayed off the parts in the cleaning apparatus 10 and conveyed from the sludge tank 14 through conduit 24 and inlet 25 into the filter apparatus 26. Contamination of the filter mediums along the top of the filter assembly 28 causes a considerable fluid pressure drop through the filter assembly, and thus a rise in the fluid level 27 relative to the fluid level 19 in the cleaning fluid supply tank 18. This initiates the operation of the cleaning cycle of the filter assembly 28 by means of the pressure responsive valve 136 (which is actuated, as before described, either by means of a diaphragm or a float mechanism as is conventional practice). The control system 108 then functions to cause longitudinal movement of the piston rod 104 within the cylinder 106 to rotate the sprocket drive shaft 84 a predetermined angular distance corresponding to the stroke of the piston rod 104 dependent on the magnitude of fluid pressure in the rear portion 107 of the cylinder 106. Thus, as the endless belt filter assembly 28 is moved along the dirty filter mediums are moved around the sprocket 31 underneath the washing means 110.

Simultaneously with either pressure responsive or timed actuation of the filter rotation control system, fluid pressure (at approximately 100 psi) is introduced through conduit 112 into the dispenser tube 116. The pressurized fluid exits through the restricted longitudinal slot opening 118 to impinge upon the inner or rear surface of the filter assembly. The slot 118 extends substantially across the entire effective width of the filter assembly for maximum coverage. The pressurized fluid in the form of air or liquid penetrates through the filter screen 50 and into and through the overlying filter medium 64 to effectively remove sludge and other contaminants from the filter assembly. The cleaned filter sections are then gradually moved into the lower end of the filter apparatus where they are protected by the seal plate 82.

Although the present invention has been described and shown by means of a preferred embodiment, it will be obvious by anyone skilled in the art to which the invention pertains that various modifications in arrangement and details may be made without departing from the spirit and essential characteristic thereof as defined by the appended claims.

I claim:

1. In a continuous automatic filter apparatus for removing impurities from liquid; a filter housing including opposed upright side walls and having a dirty fluid inlet and a clean fluid outlet; extending side walls of said housing being provided each with opposite inwardly projecting guide flanges, each of said guide flanges extending in a continuous loop along said opposed side walls, a continuous rotatable filter assembly disposed in said housing for intermittent incremental movement along said guide flanges; power means including a pair of coaxial drive sprockets and a pair of drive chains trained around the drive sprockets, each of said drive chains being composed of a plurality of roller members interconnected by link members for movement of the chain along said guide flanges; securing means projecting inwardly from each of said chains for attachment of said continuous rotatable filter assembly thereto; first continuous sealing means between the opposed marginal edges of the continuous filter assembly and said guide flanges; said continuous rotatable filter assembly comprising an endless screen, a washing means disposed in said housing between said side walls including a fluid dispenser extending across said continuous rotatable filter assembly for ejection of pressurized fluid therefrom against said filter assembly and; automatic control means for rotation of said drive sprocket in response to the degree of contamination of said filter mediums to rotate said filter assembly for movement of the contaminated filter mediums through said washing means; the improvement which comprises a plurality of individual filter mediums supported on said screen disposed adjacent each other along the entire length of said screen; means securing the plurality of individual filter mediums to said securing means projecting inwardly from said roller chains; a second continuous sealing means disposed in the bottom of said housing between said side walls; said sealing means extending through the housing along the lower return section of said filter assembly and partially into the upwardly inclined section of said filter assembly, said sealing means being in the form of a continuous loop attached to the inner surfaces of said opposed guide flanges to thereby close the gap between said guide flanges to prevent entrance of dirty fluid into said filter assembly from the bottom portion of said housing.

2. In the filter apparatus of claim 1, said securing means projecting inwardly from said chains comprising hooks, the marginal edges of said endless filter screen and said individual filter mediums being apertured for engagement over the hooks along opposite sides of the continuous filter assembly for support and suspension of said filter assembly between said chains across the gap between said guide flanges; and a plurality of fasteners each comprising a U-shaped clip having upper and lower leg portions for engagement over the marginal edges of said filter mediums and said endless filter screen in clamping relationship; each of the leg portions having a recess defining socket means to axially receive said hook means.

3. In the filter apparatus of claim 1, said sprocket drive shaft having an extension at one end thereof; said extension of said sprocket drive shaft being secured to a rotatable driving member comprising a rotatable one-way drive means; and actuator means to cause intermittent rotation of said one-way drive means at predetermined increments for rotation of said sprocket drive shaft to cause movement of said pair of chains along said guide flanges.

4. In the filter apparatus of claim 1, said sprockets being mounted on a shaft rotatably supported in said housing; fluid power means adapted to intermittently rotate said shaft; one-way drive means interconnecting said shaft with said fluid power means; said fluid power means comprising a cylinder fluidly connected to a source of fluid under pressure; and control means between said source of fluid under pressure and said cylinder including a pressure responsive device adapted to actuate said cylinder upon a predetermined pressure differential between said dirty fluid inlet and said clean fluid outlet to cause rotation of said sprocket shaft by said one-way drive means and thereby rotatably advance said continuous filter medium.

* * * * *